(12) United States Patent
Brand

(10) Patent No.: US 8,155,048 B2
(45) Date of Patent: Apr. 10, 2012

(54) RESOURCE ALLOCATION FOR RATELESS TRANSMISSIONS

(75) Inventor: Matthew E. Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 494 days.

(21) Appl. No.: 12/413,504

(22) Filed: Mar. 27, 2009

(65) Prior Publication Data

US 2010/0246473 A1     Sep. 30, 2010

(51) Int. Cl.
    *H04B 7/14* (2006.01)
(52) U.S. Cl. ......................... 370/315; 370/401
(58) Field of Classification Search .................. 370/315, 370/352–356, 328, 335–336, 338, 342–343, 370/345, 400–401, 428–429
    See application file for complete search history.

(56) References Cited

U.S. PATENT DOCUMENTS

| | | | |
|---|---|---|---|
| 6,873,600 B1 * | 3/2005 | Duffield et al. | 370/252 |
| 7,460,495 B2 * | 12/2008 | Li | 370/267 |
| 7,593,342 B2 * | 9/2009 | Molisch et al. | 370/238 |
| 7,822,029 B2 * | 10/2010 | Brand et al. | 370/389 |
| 2009/0122700 A1 * | 5/2009 | Aboba et al. | 370/230 |
| 2010/0157901 A1 * | 6/2010 | Sanderovitz et al. | 370/328 |

* cited by examiner

*Primary Examiner* — Chi H. Pham
*Assistant Examiner* — Kevin Mew
(74) *Attorney, Agent, or Firm* — Dirk Brinkman; Gene Vinokur

(57) ABSTRACT

A method transmits a message of a source entropy from a source node, via a set of relay nodes, to a destination node, the set of relay nodes includes a node and a next node connected by a wireless link, wherein the next node is guaranteed to receive accumulated nats from one or more previous transmissions of the message, in which a transmission of the message from the node to the next node includes determining the accumulated nats guaranteed to be received by the next node; calculating minimal nats of the message to be transmitted from the node to the next node, such that a sum of the minimal nats and the accumulated nats is not less than the source entropy; and transmitting the message having the minimal nats from the node to the next node.

17 Claims, 3 Drawing Sheets

100

200

RESOURCE ALLOCATION FOR RATELESS TRANSMISSIONS

RELATED PATENT APPLICATION

This patent application is related to U.S. patent application Ser. No. 12/271,200, "Method for Routing Packets in Ad-Hoc Networks with Partial Channel State Information," filed by Brand et al. on Nov. 14, 2008, and incorporated herein by reference.

FIELD OF THE INVENTION

This invention relates generally to wireless ad hoc networks, and more particularly to resource allocation for rateless transmissions.

BACKGROUND OF THE INVENTION

Unlike conventional wireless networks, such as cellular networks, ad-hoc networks do not have an infrastructure. Typically, ad-hoc networks use a large number of low complexity transceivers (nodes) to communicate information. This decreases cost and sensitivity to failure of a single link. This makes ad-hoc networks candidates for applications that require ultra-reliable communications links.

Highly reliable ad-hoc wireless networks have two competing constraints. The energy consumption has to be low, because the nodes are typically battery operated, and exhausting the battery can lead to failure, and the probability for successful transmission of data should be high. That is, a message is to be transmitted from a source node to a destination node within a predetermined delay constraint. Smaller delays require more energy because higher power may be required to increase reliable reception.

In ad-hoc networks, it is desired to select a route, i.e., a sequence of nodes, which passes the message to the destination within the delay constraint, while minimizing energy consumption. A simple solution uses physical-layer transmission with a fixed message size and coding rate, selected so that that each link simply attempts to transmit a message within a fixed interval of time. Then, meeting the delay constraint is equivalent to limiting the number of hops.

However, this simple approach ignores the possibility of decreasing the overall delay by using more energy on certain links, and, possibly less on others. For a single link, the trade-off between transmission time and energy is straightforward. According to the Shannon's capacity equation, the possible data rate increases logarithmically with the transmit power. However, for networks with multiple hops, the trade-off becomes much more complicated. It involves selecting a route and then an energy level for each hop along the route.

Fountain Code

Fountain codes (also known as rateless erasure codes) are a class of erasure codes with the property that a potentially limitless sequence of encoding symbols can be generated from a given set of source symbols such that the original source symbols can be recovered from any subset of the encoding symbols of size equal to or only slightly larger than the number of source symbols.

The fountain code is optimal when the original k source symbols can be recovered from any k encoding symbols. Fountain codes have efficient encoding and decoding algorithms and that allow the recovery of the original k source symbols from any k' of the encoding symbols with high probability, where k' is just slightly larger than k.

Conventional methods for resource allocation for multi-hop fountain-coded transmissions are iterative, and each step has high polynomial computational complexity.

It is desired to minimize the total energy needed to propagate a message along a path of wireless links within a fixed time constraint, considering that following nodes are receiving fragments of previous fountain-coded transmissions.

SUMMARY OF THE INVENTION

It is an object of the invention to provide a method that minimizes the total energy needed to transmit a message along a path of wireless links within a fixed time constraint, considering that following nodes accumulates fragments of the message from previous rateless transmissions.

One embodiment of the invention describes a method for transmitting a message from a source node, via a set of relay nodes, to a destination node, wherein a source entropy of the message is X nats, and wherein the set of relay nodes includes a node i and a node j following node i, and the set of relay nodes are connected by wireless links, and each link has a channel power gain $\gamma_{ij}$, and the transmitting has a time constraint T, comprising a processor for performing steps of the method, comprising the step of: minimizing a number of nats $x_i$ in the message to be transmitted from the node i to the next node j, wherein the next node j is guaranteed to receive a number of accumulated nats $x_{ac}$ from one or more previous transmissions, such that a sum of the number of nats $x_i$ and the number of accumulated nats $x_{ac}$ is not less than the source entropy X; allocating a set of resources for transmitting the message from the node i to the next node j; and transmitting the message from the node i to the next node j using the set of resources.

Another embodiment describes a method for transmitting a message of a source entropy from a source node, via a set of relay nodes, to a destination node, the set of relay nodes includes a node and a next node connected by a wireless link, wherein the next node is guaranteed to receive accumulated nats from one or more previous transmissions of the message, in which a transmission of the message from the node to the next node includes determining the accumulated nats guaranteed to be received by the next node; calculating minimal nats of the message to be transmitted from the node to the next node, such that a sum of the minimal nats and the accumulated nats is not less than the source entropy; and transmitting the message having the minimal nats from the node to the next node.

Yet another embodiment describes a system for transmitting a message of a source entropy from a source node, via a set of relay nodes, to a destination node, the set of relay nodes includes a node and a next node connected by a wireless link, wherein the next node is guaranteed to receive accumulated nats from one or more previous transmissions of the message, comprising: means for determining the accumulated nats guaranteed to be received by the next node; means for calculating minimal nats of the message to be transmitted from the node to the next node, such that a sum of the minimal nats and the accumulated nats is not less than the source entropy; and means for transmitting the message having the minimal nats from the node to the next node.

DETAILED DESCRIPTION OF THE PREFERRED EMBODIMENT

Figure 1:
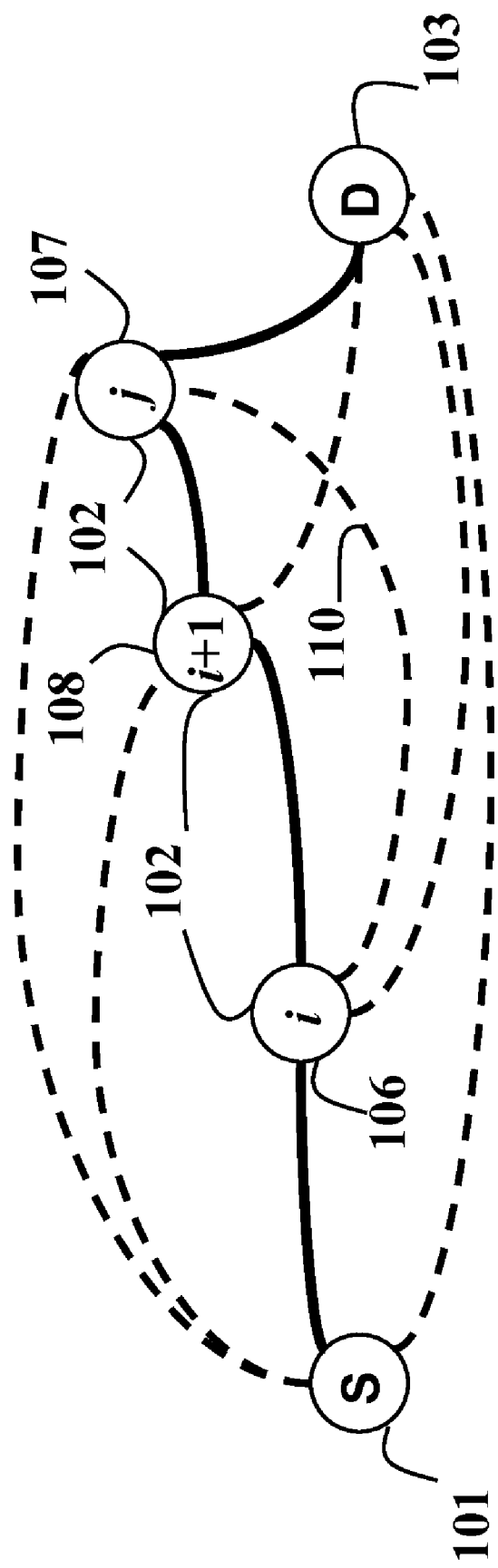
FIG. 1 is a schematic of a relay network according to embodiments of an invention with an optimal source-to-destination route highlighted.

FIG. 1 shows a relay network 100 according to embodiments of the invention with an optimal source-to-destination route highlighted. Embodiments of my invention use the network 100 for transmitting a message having a size of X nats from a source node 101 to a destination node 103 via relay of nodes 102. Time for the transmission of the message is constrained, i.e., the transmission from the source node, via the relay of nodes, to the destination node should not be greater than a predetermined T.

The relay nodes 102 include a node i 106 and a node j 107, wherein node i precedes node j. A power gain is $\gamma_{ij}$ for a channel 110 between the node i 106 and the node j 107. Note that the node i 106 is neither the source node 101 nor the destination node 103. However, the node j could be any node following the node i in the network 100, including the destination node 103.

The embodiments of the invention use multi-hop fountain-coded transmissions of the message through the network 100. Fountain coded systems can optimize multi-hop transmissions by making use of bits received by following receivers. For example, when the node i 106 transmits the message to a next node 108, the "following" node j receives at least part of the message via the channel 110. The size of the part received by the node j depends on the power gain $\gamma_{ij}$ of the channel 110.

Accordingly, the node j accumulates a number of accumulated nats $x_{ac}$ from all previous transmissions. For example, the node j 107 accumulates nats received from the transmission from the source node 101 to the node i 106 as well as nats received from the transmission from the node i 106 to the node i+1 108.

Energy Minimization for Fountain-Coded Transmission

The embodiments of the invention minimize overall energy subject to the time constraint. The relationship between an energy $e_i$, a transmission time $t_i$, a transmission power $p_i$, and minimal nats transmitted $x_{i \to j}$ (bits=nats×log 2), is disclosed in an Equation (1)

$$\min \sum_i e_i \stackrel{a}{=} \sum_i t_i p_i \stackrel{b}{=} \sum_i t_i (e^{x_{i \to i+1}/t_i} - 1)/\gamma_{i \to i+1} \quad (1)$$

$$\text{s.t.} \sum_i t_i \leq T$$

$$\forall j > 2 \sum_{i<j} x_{i \to j} \stackrel{c}{=} \sum_{i<j} t_i \log(1 + p_i \gamma_{i \to j}) \geq X,$$

where min function returns a minimum.

The equalities follow from (a) energy=time×power; (b) the power needed to transmit x nats in t time units according to the Shannon-Hartley capacity law; and (c) the Shannon-Hartley law solved for nats.

The third line of the Equation (1) describes the distinctive feature of fountain coding, i.e., each node j accumulates nats transmitted from predecessor nodes i<j. For clarity, $x_i$ is used for $x_{i \to i+1}$, $\gamma_i$ for $\gamma_{i \to i+1}$.

Transmitting $x_i$ nats from the node i to the next node in time $t_i$ requires power $p_i = (e^{x_i/t_i} - 1)/\gamma_i$. Substituting the power in the Shannon-Hartley equation yields the nats received at following node j (j>i). The resulting curve is concave decreasing in time $t_i$, so at time $t_i \to \infty$, the minimum-nats transmission is achieved. Thus, if the node i 106 transmits $x_i$ nats, the following node j (j>i) receives at least $$x_{i \to j} \geq \lim_{t_i \to \infty} t_i \log\left(1 + \frac{e^{x_i/t_i} - 1}{\gamma_i} \gamma_{i \to j}\right) = x_i \frac{\gamma_{i \to j}}{\gamma_i}. \quad (2)$$

The embodiments use a lower bound on transmitted nats $l_i \leq x_i$, such that the bound in Equation (2) is sharpened by changing $\infty$ to the maximum total time T, yielding $$x_{i \to j} \geq x_i \cdot \frac{T}{l_i} \log\left(1 + \frac{\gamma_{i \to j}}{\gamma_i}(e^{l_i/T} - 1)\right) \geq x_i \left(\frac{\gamma_{i \to j}}{\gamma_i} + \frac{l_i}{2T}\left(\frac{\gamma_{i \to j}}{\gamma_i}\left(1 - \frac{\gamma_{i \to j}}{\gamma_i}\right)\right)\right), \quad (3)$$

wherein the second inequality in the Equation (3) is tight when $l_i \to 0$.

The first inequality in the Equation (3) is made by construction. The second inequality is a linearization by series expansion around $l_i = 0$, and is a lower bound because for $\gamma_{i \to j}/\gamma_i \leq 1$ the formula is convex.

Neither bound considers time or power allocations, so I can determine independently the nat-allocation along the path. For example, in the first two links, $x_1 = X$ and $x_{1 \to 3} \geq x_1 \cdot \gamma_{i \to 3}/\gamma_1$. If each node minimizes the number of nats to transmit, i.e., the minimal nats are sufficient nats to make sure the next node receives the full message, then the upper bound is $$x_2 = X - x_{1 \to 3} \leq X(1 - \gamma_{i \to 3}/\gamma_1).$$

As defined herein, $r_{ij}$ is a coefficient describing the receiving in the following node j of the transmitting of the number of nats $x_i$ from the node i to the next node, e.g., $r_{ij}$ is the coefficient to $x_i$ in the Equation (2) or the Equation (3).

The last line of constraints in the original problem (1) is tightened to $$\forall_{j>2} \sum_{i<j} x_i r_{ij} \geq X. \quad (4)$$

Since $\forall_{ij} r_{ij} \geq 0$, the modified constraint is a convex cone. Since the modified constraint upper-bounds the number of nats that need to be transmitted, the feasible region of the modified problem is strictly interior to that of the original, and thus its solution is an upper bound. Thus, the Equation (4) is convex, and its solution upper-bounds that of the original problem of the Equation (1).

For any particular power allocation $e_i$, the relationship between nats $x_i$ and energy $e_i$ is linear. Thus, the Equation (4) is a constraint of a nat-allocation linear program (LP).

Furthermore, the solution of the Equation (4) is substituted into the original Equation (1), and obtain a separable convex program, $$\min \sum_i t_i(e^{x_i/t_i} - 1)/\gamma_i \quad (5)$$

$$\text{s.t.} \sum_i t_i \leq T$$

The Equation (5) could be solved using a hyperbolic upperbound with closed form solution in described in the related U.S. patent application Ser. No. 12/271,200, incorporated herein by reference.

Resources Allocation

Figure 2:
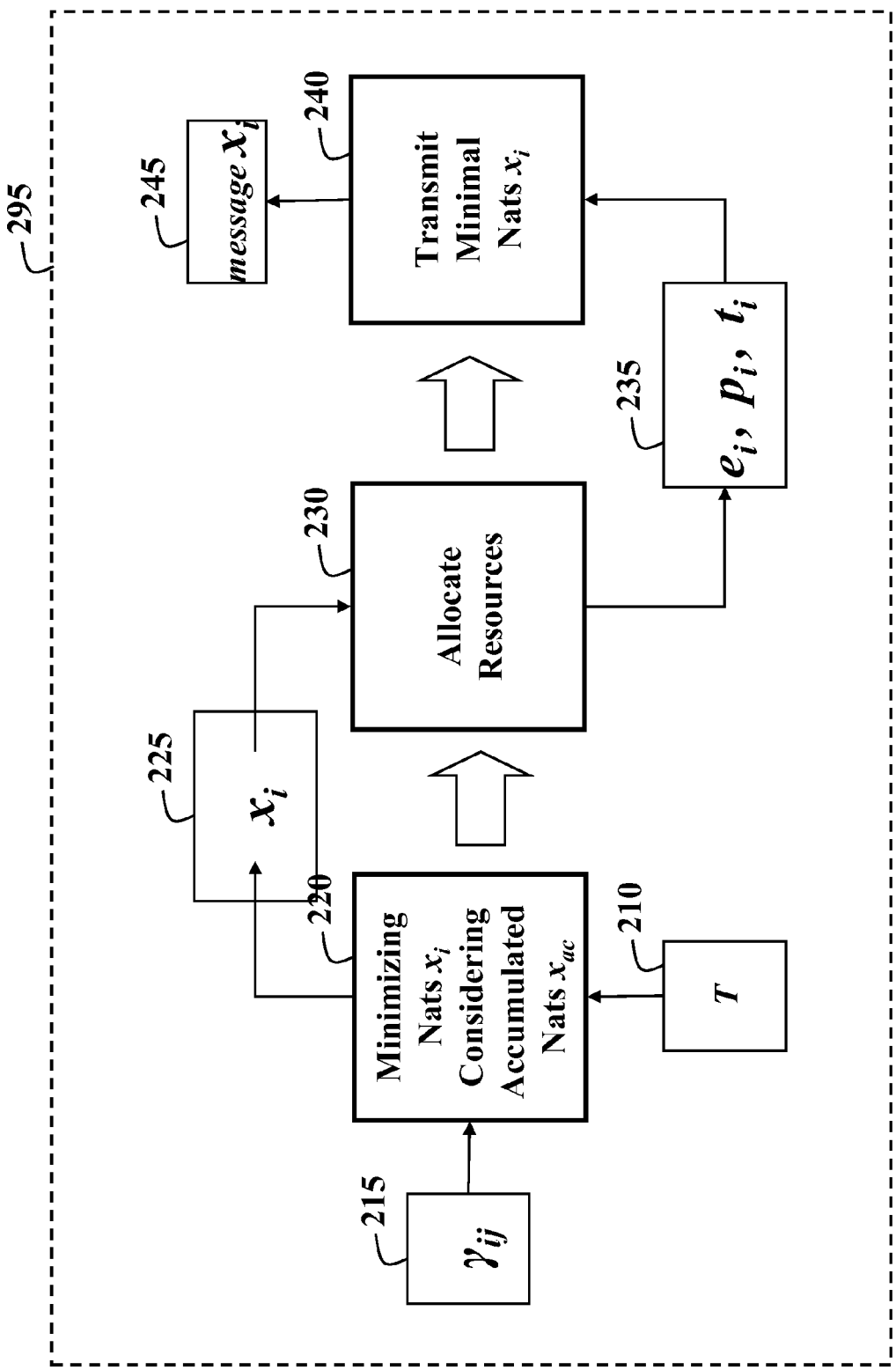
FIG. 2 is a block diagram of a method for resource allocation for multi-hop fountain-coded transmissions of a message according to the embodiments of the invention.

FIG. 2 shows a method 200 for allocating resources for multi-hop fountain-coded transmissions of a message according to embodiments of the invention. The steps of the method 200 are performed using a processor 295.

A minimal nats xi of the message to be transmitted from the node i to the next node is determined, considering that the next node already received and accumulated a number of accumulated nats $x_{ac}$ from previous transmissions.

According to rateless, e.g., fountain-coded, transmission, each node should receive at least a full message, thus the sum of the minimal nats $x_i$ and the accumulated nats $x_{ac}$ should not be less than X nats, wherein X nats is a source entropy of the message. Time T 210 for the transmission of the message from the source node to the destination node, and channel power gains $\gamma_{ij}$ 215 of the links in the network 100 are inputs to the method 200.

For the determining 220, I minimize a weighted sum of all nats transmitted via the relay of nodes 102 subject to the constraint that each node 102 receives the full message of size X according to $$\min \sum_i c_i x_i \qquad (6)$$
$$\text{s.t. } \forall_{j \geq 2} \sum_{i < j} x_i r_{ij} \geq X,$$

where min is a minimization function, $c_i$ is a cost parameter, $r_{ij}$ is a number of the nats $x_i$ received by the node j as a result of the transmission from the node i to the next node.

Figure 3:
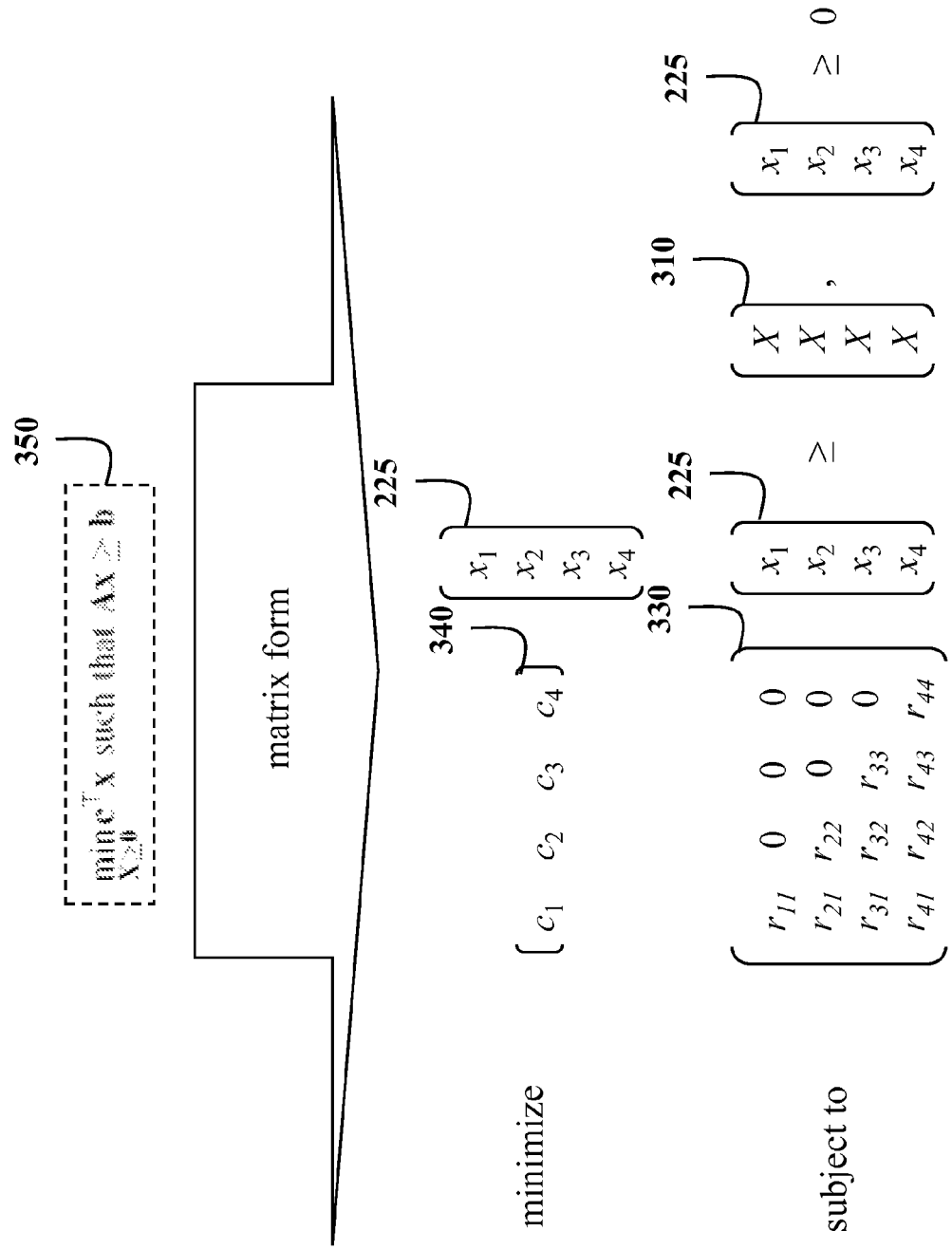
FIG. 3 is an example of a nat-allocation linear program (LP) according to the embodiments of the invention.

Equation (6) is the nat-allocation LP, which can be rewritten in canonical form 350 as shown on FIG. 3

$$\min_{X \geq 0} c^\top x \text{ such that } Ax \geq b, \qquad (7)$$

where b is a nats allocation vector 310, such that b=1·X, A is a triangular matrix 330, such that $A_{i \geq j} = r_{ij}$, where i and j are indices of the relay nodes, and c is a vector 340 of cost parameters $c_i$, such that $c_i = 1/\gamma_i$. The triangular matrix A 330 can be rewritten for the channel power gains $\gamma_{ij}$, or for the cost parameters $c_{ij}$. Vector $x_i$ 225 describes the minimal nats to be transmitted from the node i to the next node.

Closed-Form Solution of the LP

The number of nats $x_i$ 225 is determined 220 by arithmetically solving the LP, i.e., sequentially choosing the smallest $x_i$ to satisfy the $i^{th}$ constraint, if the triangular matrix A 330 is cascading. Otherwise, I determining 220 the number of nats xi 225 by solving the LP using a conventional linear program solver.

The triangular matrix A 330 is cascading if each diagonal dominates the next diagonal, i.e., $A_{ij} > A_{ij-1}$ and $A_{ij} > A_{i+1j}$, which corresponds to the case where the channel gain ratios $r_{ij}$ decrease with hop-distance |i−j| in the path.

If matrix A 330 is cascading and $c_i \geq c_{i+1}$, than each row of the matrix A 330 is increasing from left to right. For any i<j, it costs more to satisfy the $j^{th}$ constraint by increasing $x_i$ than by increasing $x_j$. Consequently the optimal $x_j$ takes on the minimum value needed to satisfy $i^{th}$ constraint; subsequent constraints can be ignored. If C=diag(c) and y=Cx the LP could be rewritten as $\min(c^T C^{-1})(Cx) = 1^T y$ such that $(AC^{-1})(Cx) = AC^{-1} y \geq b$, which indicates that a sequential solution is possible.

The sequential arithmetic solution $\hat{x}$ may coincide with the LP optimum, even if the problem is not cascading. In fact, I can check for optimality by solving a triangular linear system of equations.

If solution $\hat{x}$ is optimal and positive, slack variables in the LP and a dual variables must be zero. In LP a slack variable is a variable which is added to a constraint to turn the inequality into an equation. The Duality Theorem implies a relationship between a primal and a dual variable known as a complementary slackness.

According to the complementary slackness, the dual variable y must be strictly positive for unique optima; and nonnegative otherwise. Zero slack variables imply $A^T y = c$. Since matrix A is full-rank, solutions $\hat{x}$ and $\hat{y}$ are unique. Since the LP is strictly positive it is primal and dual bounded and thus by strong duality, $b^T \hat{y} = c^T \hat{x}$. Thus, if $\hat{x} > 0$ and $A^T y = c$ has solution $\hat{y}$ satisfying $\hat{y} \geq 0$ and $c^T \hat{x} = b^T \hat{y}$, then $\hat{x}$ optimizes the LP, and if solution $\hat{y} > 0$, solution $\hat{x}$ is unique.

Conserving Energy in the LP

At fixed power, the transmit time over each link is proportional to the number of nats transmitted, i.e., $t_i = k_i x_i$ for some coefficient $k_i$ to be determined below. Furthermore, the minimal energy needed to transmit $x_i$ nats in time $t_i = k_i x_i$ is $e_i = x_i \cdot k_i / \gamma_i (\exp 1/k_i - 1)$. Hence, energy $e_i$ is linear in nats $x_i$, and the nat-allocation linear program (7) considers energy by setting $c_i = k_i / \gamma_i (\exp 1/k_i - 1)$.

For energy minimization using hyperbolic bounds of order n, the optimal time allocation increases with the $(n+1)^{th}$ root of the attenuation, see the related U.S. patent application Ser. No. 12/271,200, incorporated herein by reference. I use $$k_i = \lambda / \sqrt[n+1]{\gamma_i}$$

for some λ, which is proportional to the Lagrange multiplier of the time allocation problem. Then, the linear program cost coefficients are $$c_i = \lambda \gamma_i^{-(n+2)/(n+1)} \left( \exp^{n+1\sqrt{\gamma_i}} / \lambda - 1 \right). \qquad (8)$$

The first λ out of Equation (8) can be eliminated because the LP solution only depends on the ratios $c_i/c_j$. Similarly, since we need to preserve ratios, $$\lim_{\lambda \to \infty} \frac{\exp^a / \lambda - 1}{\exp^b / \lambda - 1} = \frac{a}{b},$$
$$\text{if } \forall_i \hat{\lambda} \gg \sqrt[n+1]{\gamma_i}.$$

for general a,b and therefore the subexpression $$\exp^{n+1\sqrt{\gamma_i}} / \lambda - 1$$

can be replaced with $$\sqrt[n+1]{\gamma_i}$$

when the Lagrange multiplier is large. So for a large gain λ, the cost coefficient of Equation (8) simplifies to $$c_i \sim \gamma_i^{-1} \quad (9)$$

For a small gain λ, I approximate the cost structure of the Equation (9). An error bound on the ratio $c_i/c_j$ is developed using Equation (9) in place of the Equation (8).

For b≧a>0 and any error fraction δ>0, $$\frac{a}{b} \geq \frac{\exp^a/\lambda - 1}{\exp^b/\lambda - 1} \geq (1-\delta)\frac{a}{b};$$

the first inequality holds always, and the second holds when the gain λ meets or exceeds any of $$\frac{b-a}{-\log(1-\delta)} \leq \frac{b-a}{\frac{\delta}{z}\log\frac{1}{1-z}} < \frac{b-a}{\delta} < \frac{b}{\delta} \text{ for } \delta \geq z > 0,$$

The first inequality is obtained from $$\lim_{\lambda \to \infty} \frac{\exp^a/\lambda - 1}{\exp^b/\lambda - 1} = \frac{a}{b},$$

which is described below. For the second inequality, since $$\frac{\exp^a/\lambda - 1}{\exp^b/\lambda - 1} \geq \frac{a\exp^a/\lambda}{b\exp^b/\lambda},$$

I solve $$\frac{\exp^a/\lambda}{\exp^b/\lambda} = (1-\delta)$$

to obtain a guarantee at $$\lambda \geq \frac{b-a}{-\log(1-\delta)}.$$

The second form places a chord inside the convex denominator on δ∈[0, z]; the third relaxes the slope of the chord; the fourth relaxes its intercept.

Setting $$a = \sqrt[n+1]{\gamma_i} \text{ and } a = \sqrt[n+1]{\gamma_j}$$

and multiplying the guarantee by $$\frac{a^{-n-2}}{b^{-n-2}} = \frac{\gamma_i^{-(n+2)/(n+1)}}{\gamma_j^{-(n+2)/(n+1)}}$$

then yields a bound on any error in the LP cost coefficients:

$$\frac{\gamma_i^{-1}}{\gamma_j^{-1}} \geq \frac{c_i}{c_j} \geq (1-\delta)\frac{\gamma_i^{-1}}{\gamma_j^{-1}}. \quad (10)$$

Given the cost structure $c_i \propto \gamma_i^{-1}$, Adiag(c)$^{-1}$ is a lower triangular matrix of channel gains. This matrix is expected to cascade, because channel gains $\gamma_{i \to j}$ usually decrease with hop-distance |i-j| in the path. For example, a sufficient, but not necessary condition, that often holds in practice, is that all gains on links spanning k hops are greater than all gains on links spanning k+1 hops, for all k.

Allocation of Resources

Using the minimal nats $x_i$ 225 to be transmitted by each node 240, I allocate 230 the resources necessary for the transmission 240. During the allocation step 230, I determine the energy $e_i$ required for the transmitting 240 the message 245 of nats $x_i$ within the transmission time $t_i$ by finding a hyperbolic upper bound with closed-form solution for an energy curve $$e_i = t_i(e^{x_i/t_i} - 1)/\gamma_i, \text{ such that } \sum_i t_i \leq T.$$

Similarly, I determining the transmission time $t_i$ based on the energy $e_i$. Details on finding the hyperbolic upper bound are disclosed in the related U.S. patent application Ser. No. 12/271,200. Finally, I determine the transmission power $p_i$ required for the transmitting the number of nats $x_i$ within the transmission time $t_i$ based on the energy $e_i$ and the transmission time $t_i$ according to $p_i = e_i/t_i$.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for transmitting a message from a source node, via a set of relay nodes, to a destination node, wherein a source entropy of the message is X nats, and wherein the set of relay nodes includes a node i and a node j following node i, and the set of relay nodes are connected by wireless links, and each link has a channel power gain $\gamma_{ij}$, and the transmitting has a time constraint T, comprising a processor for performing steps of the method, comprising the step of:

minimizing a number of nats $x_i$ in the message to be transmitted from the node i to the next node j, wherein the next node j is guaranteed to receive a number of accumulated nats $x_{ac}$ from one or more previous transmissions, such that a sum of the number of nats $x_i$ and the number of accumulated nats $x_{ac}$ is not less than the source entropy X;

allocating a set of resources for transmitting the message from the node i to the next node j; and transmitting the message from the node i to the node j using the set of resources, wherein the steps are performed in the processor.

2. The method of claim 1, wherein the set of resources is selected from the group including a transmission time $t_i$ required for the transmitting the number of nats $x_i$, an energy $e_i$ required for the transmitting the number of nats $x_i$ within the transmission time $t_i$, a transmission power $p_i$ required for the transmitting the number of nats $x_i$ within the transmission time $t_i$, and combination thereof.

3. The method of claim 1, wherein the minimizing further comprising:
  constructing a nat-allocation linear program (LP)
  min $c^T x$ such that $Ax > b$
  $X \geq 0$
  wherein b is a nats allocation vector, such that $b = 1 \cdot X$, A is a triangular matrix, such that $A_{i \geq j} = r_{ij}$ is an index of a next node, such that $j > i$, the next node j is connected to the node i by a wireless link with a channel power gain $\gamma_{ij}$, $c_i$ is cost parameter vector, such that $c_i = 1/\gamma_i$, $r_{ij}$ is a coefficient describing an overhearing in the following node j the transmitting of the number of nats $x_i$ from the node i to the next node, min is a function that returns a minimum, and T is a tranpose operator; and
  determining the number of nats $x_i$ by arithmetically solving the LP, if the triangular matrix A is cascading; and otherwise
  determining the number of nats $x_i$ by solving the LP using a generic linear program solver.

4. The method of claim 3, wherein the allocating further comprising:
  constructing an energy curve $e_i = t_i (e^{x_i/t_i} - 1)/\gamma_i$,
  determining hyperbolic upper bounds for the energy curve; and
  determining the energy $e_i$ and the transmission time $t_i$ by solving in closed-form for a lowest point on a sum of the hyperbolic upper bounds that satisfies $$\sum_i t_i \leq T.$$

5. The method of claim 4, wherein the allocating further comprising:
  tighting the hyperbolic upper bounds based on the energy $e_i$ and the transmission time $t_i$; and
  repeating the allocating.

6. The method of claim 4, wherein the allocating further comprising:
  determining the transmission power p, based on the energy $e_i$ and the transmission time $t_i$ according to $p_i = e_i/t_i$.

7. The method of claim 1, wherein the following node j is the destination node.

8. A method for transmitting a message from a source node, via a set of relay nodes, via a set of relay nodes, to a destination node, the set of relay nodes includes a node and a next node connected by a wireless link, wherein the next node is guaranteed to receive accumulated nats from one or more previous transmissions of message, comprising a processor for performing the steps of the method, wherein the transmission of the message from the node to the next node comprising the steps of:
  determining the accumulated nats guaranteed to be received by the next node;
  calculating minimal nats of the message to be transmitted from the node to the next node, such that a sum of the minimal nats and the accumulated nats is not less than the source entropy; and
  transmitting the message having the minimal nats from the node to the next node, wherein the steps are performed in the processor.

9. The method of claim 8, further comprising:
  allocating a set of resources for the transmitting of the message.

10. The method of claim 8, wherein the determining and the calculating further comprising:
  constructing a nat-allocation linear program (LP); and
  solving LP to determine the minimal nats.

11. The method of claim 10, wherein the solving uses a triangular matrix, the solving further comprising:
  solving the LP arithmetically, if the triangular matrix is cascading.

12. The method of claim 10, wherein the solving uses a triangular matrix, the solving further comprising:
  solving the LP using a generic linear program solver, if the triangular matrix is not cascading.

13. The method of claim 9, wherein the set of resources is selected from the group including a transmission time, an energy, a transmission power, and combination thereof.

14. The method of claim 13, further comprising:
  determining the energy and the transmission time based on the minimal nats, a power gain of a channel between the node and the next node, and a time constrain for the transmission from the source node, via the relay of nodes, to the destination node.

15. The method of claim 14, further comprising:
  determining the transmission power based on the energy and the transmission time.

16. The method of claim 8, wherein the transmission is a rateless erasure codes transmission.

17. The method of claim 8, wherein the transmission is a Fountain-Coded transmission.

* * * * *